Aug. 21, 1951
A. H. TAYLOR
2,565,151
METER FOR MEASUREMENT OF REFLECTANCE
Filed July 24, 1947
2 Sheets-Sheet 1
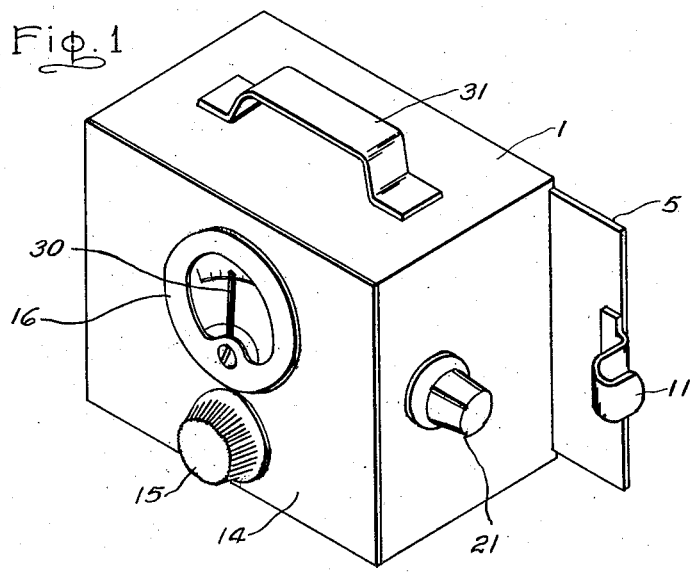
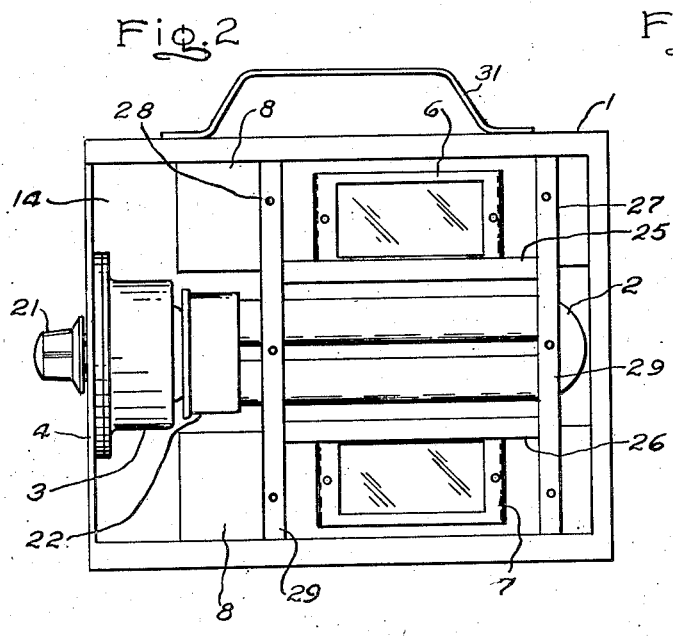
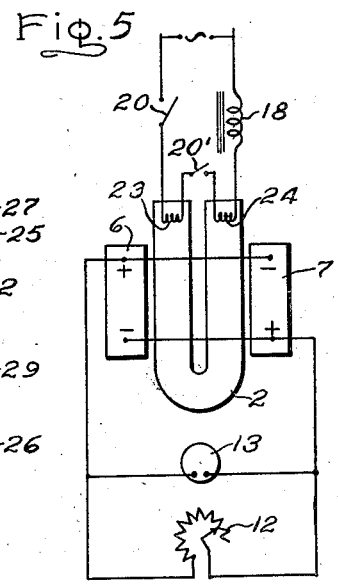
Inventor:
Augustus Hadley Taylor,
by Vernet C. Kauffman
His Attorney.

Aug. 21, 1951     A. H. TAYLOR     2,565,151
METER FOR MEASUREMENT OF REFLECTANCE
Filed July 24, 1947     2 Sheets-Sheet 2
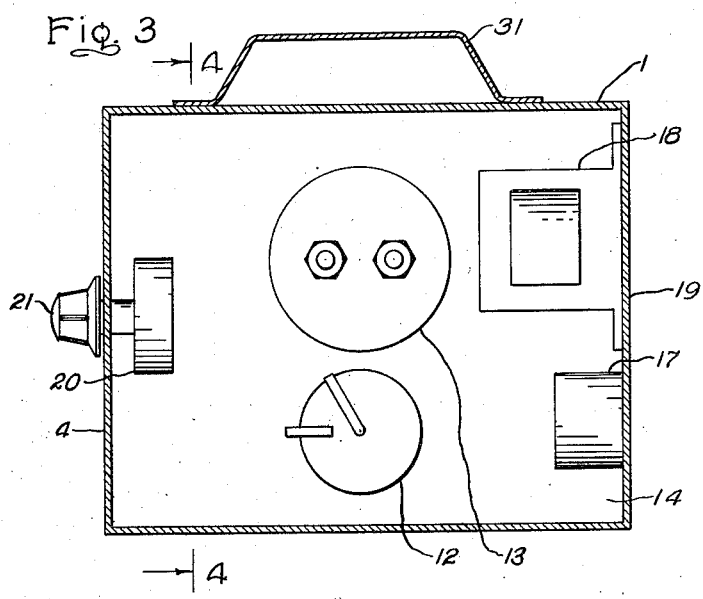
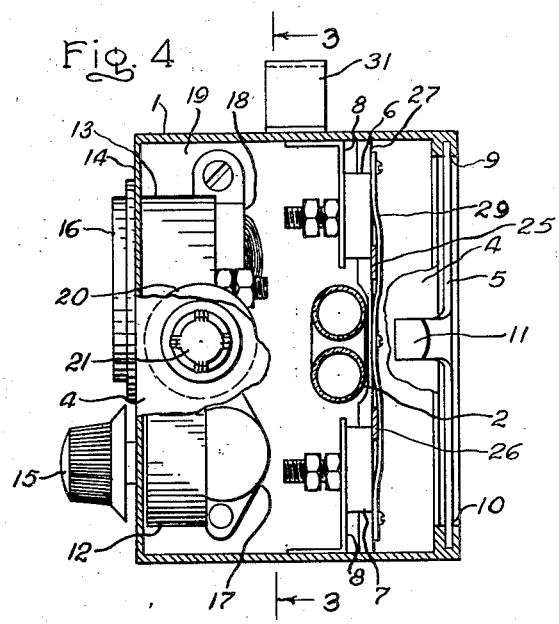
Inventor:
Augustus Hadley Taylor,
by Vernet C. Kauffman
His Attorney Patented Aug. 21, 1951

2,565,151

UNITED STATES PATENT OFFICE 2,565,151

METER FOR MEASUREMENT OF REFLECTANCE

Augustus Hadley Taylor, Cleveland Heights, Ohio, assignor to General Electric Company, a corporation of New York Application July 24, 1947, Serial No. 763,285

1 Claim. (Cl. 250—83)

My invention relates to portable meters for measuring radiant energy and its principal object is to provide such a meter for measuring the reflectance of flat surfaces. Further objects and advantages of the invention will appear from the following description of a species thereof and from the accompanying drawings in which Fig. 1 is a perspective view of the new meter; Fig. 2 is an elevational view of the back of the meter with the back wall removed; Fig. 3 is a sectional view taken along the line 3—3 of Fig. 4 in the direction of the arrows; Fig. 4 is a side elevational, partly sectional view taken along the line 4—4 of Fig. 3 with part of the side wall shown in elevation and with the back wall in place; and Fig. 5 is a wiring diagram of the meter shown in Figs. 1 to 4.

Referring to Figs. 1 to 4 of the drawing the meter comprises a metal box-like housing or casing 1 in which is mounted a U-shaped tubular discharge lamp 2 supported by a socket 3 attached to the side wall 4 of the housing 1. The legs of the lamp 2 are disposed in a common plane parallel with the back wall 5 of the housing and two light sensitive cells 6 and 7 are supported above and below the lamp 2 and between the lamp 2 and the back wall 5 of the housing by the angle brackets 8 (Fig. 4). The light sensitive surfaces of the two cells 6 and 7 are in a common plane parallel with the back wall 5 of the housing and face the said wall 5 which is in the form of a slide mounted in grooves 9 and 10 (Fig. 4) and provided with a finger grip 11 for ready removal from the housing 1. When measuring the reflectance of a flat surface the back wall 5 may be removed and the housing 1 may be held with its open back against the surface to block off light other than that from lamp 2. With the lamp 2 operating, the portion of the flat surface covered by the box reflects light from the lamp 2 back toward the cells 6 and 7 which are connected to the rheostat 12 and the microammeter 13 mounted on the front wall 14 of the housing 1 with the turning knob 15 of the rheostat 12 and the dial face 16 of the microammeter 13 on the outside of the front wall 14. The reflectance of the surface is easily read on the calibrated dial face 16.

Current for the lamp 2 is supplied through the connector socket 17 (Fig. 3) and the choke coil 18 mounted on the side wall 19 and near the front wall 14 and also through the lamp socket 3 mounted on the opposite end wall 4. A manual starting switch 20 for the lamp 2 is also mounted on side wall 4 with its control knob 21 on the outside of the wall. As shown at 20 and 20' of Fig. 5 switch 20 is a double switch which connects the lamp 2 across a power source and momentarily connects the lamp electrodes in series across the source during starting. The lamp 2 is of the type disclosed in the U. S. Patent 2,182,732 issued December 5, 1939 to Meyer et al. and comprises a base 22 attached to the spaced ends of a tubular U-shaped glass envelope which transmits radiation of 2537 Å. wave length and contains a conducting gaseous atmosphere of argon or other rare gas and mercury vapor which emits such radiation as well as radiation of other wave lengths when an electric discharge is produced in the lamp. A pair of cooperating discharge supporting electrodes 23 and 24 (Fig. 5) are mounted at the ends of the lamp envelope. The meter may be used to measure the reflectance of various kinds of flat surfaces for the 2537 Å. wave length radiation emitted by the lamp 2 by properly constructing and connecting the light sensitive cells 6 and 7 which receive such reflected radiation.

As shown in the wiring diagram of Fig. 5 the light sensitive cells 6 and 7 are connected in series in a closed circuit. The microammeter 13 and the rheostat 12 are connected across the leads connecting the cells in series and with the rheostat in shunt with the microammeter. The cells are of the blocking or barrier layer type having a light sensitive surface responsive to the 2537 Å. wave length radiation and other radiations emitted by the lamp. Such cells are available commercially and their characteristics are well known to those skilled in photometry. One cell has a cover of ordinary glass which does not transmit the 2537 Å. wave length radiation of the lamp while the other cell has a cover of material, such as quartz, which has a high transmission for such radiation. The two cells 6 and 7 are electrically balanced before the meter is used so as to generate equal currents when exposed to radiation from the lamp having wave lengths longer than 3000 Å. This may be done by covering both the cells with a glass plate transparent to such radiation and opaque to radiation of 2537 Å. wave length and then, if necessary, adjusting the opaque strips 25 and 26 (Figs. 2 and 4) which are clamped against support members 27 and 28 by strap 29 so that they may be slid into position in front of the light sensitive surface of the cells 6 and 7 to mask part of the surface and block off therefrom more or less of the reflected light transmitted by the glass plate to bring into balance the current generated by the light sensitive surfaces of the cells 6 and 7. Thus, when the glass plate is removed the cell provided with the quartz cover and responsive to the 2537 Å. wave length radiation generates a stronger current than the other cell. The difference in current generated by the cells is measured by the microammeter 13 which is connected so as to match the polarity of the cell sensitive to the 2537 Å. wave length energy. The microammeter 13 is calibrated so that the reflectance of the surface being measured may be read directly and compared with the reflectance of a standard reflectance plate.

The surface of the removable back wall 5 constitutes the standard reflectance plate of the meter. The rheostat 12 connected in shunt with the microammeter 13 is provided for adjusting the latter while the lamp is operating and the back wall in place until its indicating needle 30 is brought to a marked index line on the dial face 16 which corresponds to the reflectance of the standard surface. With the back of the housing 1 held against the flat surface to be measured the back wall is removed. The reflectance of the surface to be tested may then be read on the dial face 16 of the microammeter 13 and compared with the reflectance of the standard plate.

A handle 31 is provided on the top of housing 1 to facilitate transportation of the meter.

What I claim as new and desire to secure by Letters Patent of the United States is:

A portable meter for measuring the reflectance of a flat surface for radiation of 2537 Å. wavelength comprising a housing having an open back the sides of which are adapted to engage the flat surface to be measured and block off light from without the housing, the housing having a removable wall covering said open back and having a surface of known reflection for radiation of 2537 Å. wavelength and which serves as a standard plate, a mercury vapor ultraviolet lamp capable of emitting radiation of 2537 Å. wavelength together with some radiations of longer wavelength and mounted in said housing in position to illuminate said plate, a pair of light-sensitive surfaces substantially equidistant from and on opposite sides of said lamp and substantially in a common plane parallel with said plate and facing away from the lamp and toward said plate so that both said surfaces receive only reflected light of equal intensity, one of said cells having a cover of vitreous material pervious to light radiations down to and including 2537 Å. wavelength, the other cell having a cover of ordinary glass impervious to radiations of 2537 Å. wavelength but pervious to radiations of longer wavelength, a current-measuring device mounted in said housing with its face exposed to view and being connected between the series connections between said cells so as to measure the difference in current generated by the respective cells, said cells being equally sensitive to radiations of wavelength longer than 3000 Å. so they produce no deflection of said current-measuring device when both are exposed to such radiations, and an adjustable resistance connected electrically in parallel with said current-measuring device to adjust the current flow therethrough so that the scale deflection of the current-measuring device indicaes directly the reflectance of the surface being tested for 2537 Å. radiations.

AUGUSTUS HADLEY TAYLOR.

REFERENCES CITED

The following references are of record in the file of this patent:

UNITED STATES PATENTS

| Number | Name | Date |
|---|---|---|
| 1,778,000 | Foulke | Oct. 7, 1930 |
| 1,834,905 | Sheldon | Dec. 1, 1931 |
| 2,060,957 | Tarvin et al. | Nov. 17, 1936 |
| 2,114,163 | Bird | Apr. 12, 1938 |
| 2,127,477 | Carpenter et al. | Aug. 16, 1938 |
| 2,349,754 | Porter | May 23, 1944 |

FOREIGN PATENTS

| Number | Country | Date |
|---|---|---|
| 646,511 | Germany | June 18, 1937 |